United States Patent [19]

Oakes et al.

[11] 4,445,708
[45] May 1, 1984

[54] ENERGY ABSORBING STEERING COLUMN FOR VEHICLES

[75] Inventors: Edmond G. Oakes, St. Charles; Frederick P. Arndt; Leonard F. Grandel, both of Saginaw, all of Mich.

[73] Assignee: General Motors Corporation, Detroit, Mich.

[21] Appl. No.: 492,606

[22] Filed: May 9, 1983

[51] Int. Cl.³ ............................................. B62D 1/18
[52] U.S. Cl. .................................... 280/777; 74/492; 180/78; 188/371; 308/6 B
[58] Field of Search ...................... 280/777, 731, 801; 180/78; 188/371; 74/494, 493, 492; 308/6 B

[56] References Cited

U.S. PATENT DOCUMENTS

| 3,538,785 | 11/1970 | Grancon | 74/492 |
| 3,788,148 | 1/1974 | Connell et al. | 74/492 |
| 3,899,937 | 8/1975 | Nagazumi | 74/492 |
| 4,006,647 | 2/1977 | Oonuma et al. | 188/371 X |

Primary Examiner—Joseph F. Peters, Jr.
Assistant Examiner—Mitchell J. Hill
Attorney, Agent, or Firm—Charles R. White

[57] ABSTRACT

A collapsible steering column for automobiles including an energy absorber having rollable deformer balls with the balls being active throughout all loading conditions of the column to effectively absorb energy for all load conditions from light load to maximum load for the full column stroke.

3 Claims, 4 Drawing Figures

ENERGY ABSORBING STEERING COLUMN FOR VEHICLES

This invention relates to vehicle steering columns and more particularly to a new and improved energy absorbing steering column capable of effectively absorbing the energy of a wide range of steering column loads causing the column to telescopically collapse to lengths varying with loads.

In the present invention a deforming ball unit is operatively interposed between the upper and lower cylindrical metallic mast jackets of a telescopically collapsible steering column. The deforming ball unit comprises a cylindrical nylon carrier sleeve in which upper and lower annularly arranged sets of steel balls are rotatably mounted. These balls contact and have interference fit with the outer wall of the lower jacket and the inner wall of the upper jacket. When the mast jackets and the deforming ball unit are initially assembled together, the balls may form initial tracks or grooves of predetermined lengths in the walls of either or both of the jackets. When installed in a vehicle and when the magnitude of a steering column impact load causes the telescopic movement of the upper mast jacket relative to the lower mast jacket, the deforming balls linearly extend the tracks by working and displacing the metal of the upper and lower jacket as the steering column is collapsed. With the balls working the metal to extend the tracks, the energy of a given load is effectively dissipated at a constant rate until column collapse is terminated. To increase energy absorption capability and to tailor this column so that provides greater operator protection for larger loads, the upper and lower jackets are formed with ramps or ramp sections which the balls encounter while forming linear grooves or tracks therein. While encountering the ramps, more material is worked as the balls plow their tracks so that energy absorption is increased as the column is stroked. In this invention ramps are coined in or otherwise provided on the walls of the upper and lower jackets at the opposite ends of the ball unit respectively coacting with the upper and lower ball sets to provide additional stages of energy absorption within a prescribed length of telescopic collapse. Thus after both ball sets forcibly track the cylindrical wall portions of the upper and lower jackets in a first stage of energy absorption, column loading may be such that the upper ball sets engage upper ramps in the upper jacket for a second stage of energy absorption. In this second stage, energy is absorbed at a progressively increasing rate while the column telescopically collapses. If the load is such that telescoping continues, the lower ball set reaches the lower ramp section in the lower jacket so that energy is absorbed at a third and higher rate in the third stage of energy absorption.

In the event that it is desired to have upper and lower ball sets engage their associated ramps at the same time, they can be spaced from the associated ball sets so that they are simultaneously encountered. Additionally, energy absorption can be tailored by varying ramp angle or by varying the hardness or material of the ramps.

It is a feature, object and advantage of this invention to provide a new and improved energy absorbing steering column in which deforming balls track the walls of upper and lower mast jackets telescoping under impact loads to effectively absorb the energy of: light loads in a first discrete stage of operation, intermediate loads in a second discrete stage of operation and high loads in a discrete third stage of operation.

It is another feature, object and advantage of this invention to provide a new and improved telescopically collapsible energy absorbing steering column providing improved energy absorption capability for any given load and for any length of column collapse.

Another feature, object and advantage of this invention is to provide a new and improved telescopically collapsible energy absorbing steering column having telescopic upper and lower jackets in which deforming ball members cooperate with ramp members of the jackets to provide multiple levels of energy matched with column loads over a foreshortened amount of telescopic collapse.

These and other features, advantages and objects of the invention will be readily apparent from the following specification and from the drawings wherein.

Figure 1:
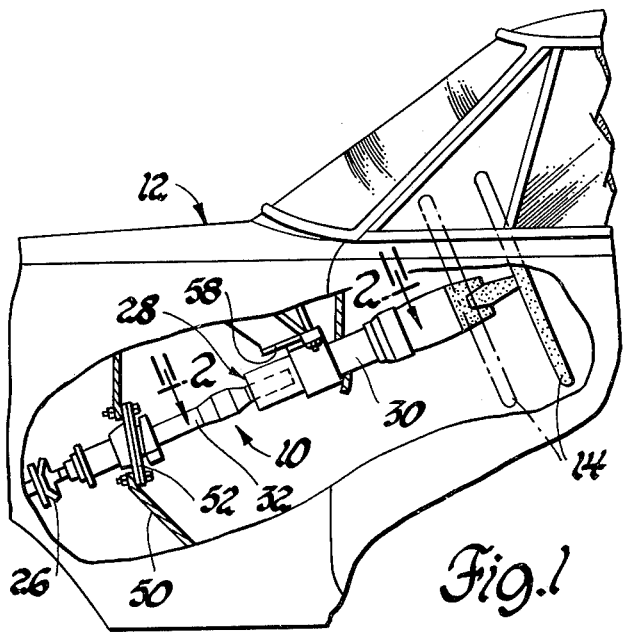
FIG. 1 is an elevational view of an automotive vehicle body partially broken away to show an energy absorbing steering column assembly operatively mounted therein
Figure 3:
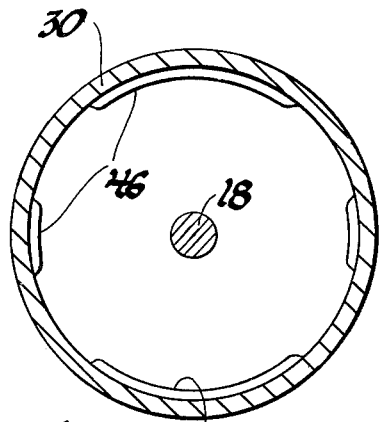
FIG. 3 is an enlarged sectional view taken generally along line 3—3 of FIG. 2.

Turning now in greater detail to the drawing, FIG. 1 illustrates an energy absorbing steering column assembly 10 operatively mounted within an automotive vehicle 12 having a hand wheel 14 which can be manually operated by a vehicle operator for steering the dirigible road wheels of the vehicle. The hand wheel 14 is mounted to the upper end of a steering shaft assembly 16 which includes an upper shaft 18 mounted for telescopic movement in a tubular lower shaft 20. The upper and lower shafts have conventional mating flats, not shown, so that the two shafts turn together as an assembly when the steering wheel is turned. The upper and lower steering shafts are held in an outer position by breakaway plastic connectors 22 which shear on application of predetermined load to the steering shaft assembly to allow these parts to telescopically collapse. The lower end of the lower steering shaft is connected through a conventional flexible coupling 26 to a steering gear which in turn is drivingly connected to the dirigible wheels of the vehicle through conventional steering gear linkage, not shown.

Figure 2:
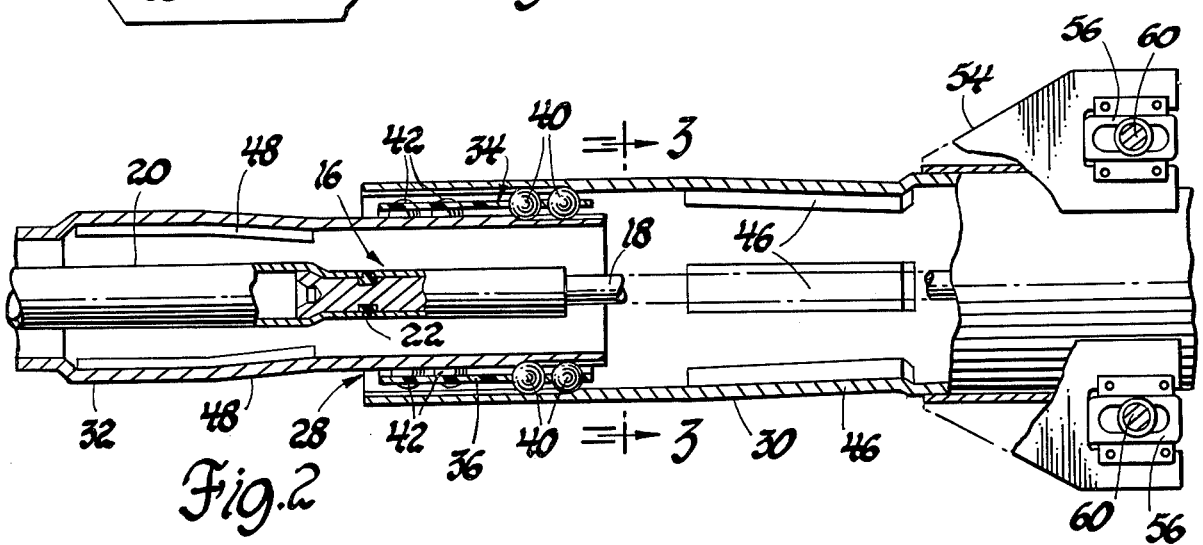
FIG. 2 is an enlarged view with some parts in section of the steering column taken generally along the line 2—2 of FIG. 1.

In addition to the steering shaft assembly 16, the steering column 10 comprises a mast jacket assembly 28 comprising interfitting upper and lower tubular mast jackets 30 and 32 of steel which have different diameters to telescope together under a wide range of impact loads. As shown in FIG. 2, the upper end portion of the lower jacket slidably fits into the lower end portion of the upper jacket. Interposed between these end portions is a deforming ball and sleeve assembly 34. This assembly comprises a tubular sleeve 36 of nylon or other suitable material in which upper and lower sets 40, 42 of identical steel balls are rotatably mounted. These balls have a diameter slightly greater than the normal diametrical clearance between the end portions of the upper and lower mast jackets 30, 32 so that only short linear tracks are initially formed during assembly in the inner surface of the upper mast jacket and in the outer surface of the lower mast jackets as the parts are initially assembled together into the FIG. 1 arrangement. The upper mast jacket has an annular series of identical ramps 46 coined or otherwise provided therein which are axially aligned with and spaced a predetermined distance from the upper ball sets 40. With such construction, the balls of ball sets continue the linear tracks and deform metal of the jackets and thereby dissipate energy at a predetermined level before ramps 46 are reached by ball sets 40. As will be further pointed out below, under some high load impacts the balls of sets 40 can displace ramp metal when tracking so that the rate of energy absorption is increased as the jackets are further telescoped together. The lower mast jacket 32 has similarly arcuately spaced and aligned ramps 48 which serve to increase the rate of energy absorption as the lower ball sets 42 roll tracks therein as the column strokes toward its maximum stroke.

As best shown in FIG. 1, the lower mast jacket 32 is mounted to a front bulkhead 50 in vehicle 12 by conventional bracket construction 52. The upper mast jacket 46 has a bracket 54 welded or otherwise affixed thereto which carries release capsules 56. These capsules attach to the lower portion of the instrument panel 58 by bolts 60 such as described in U.S. Pat. No. 3,392,599 issued July 16, 1968 to R. L. White for Energy Absorbing Device which is hereby made of record.

Figure 4:
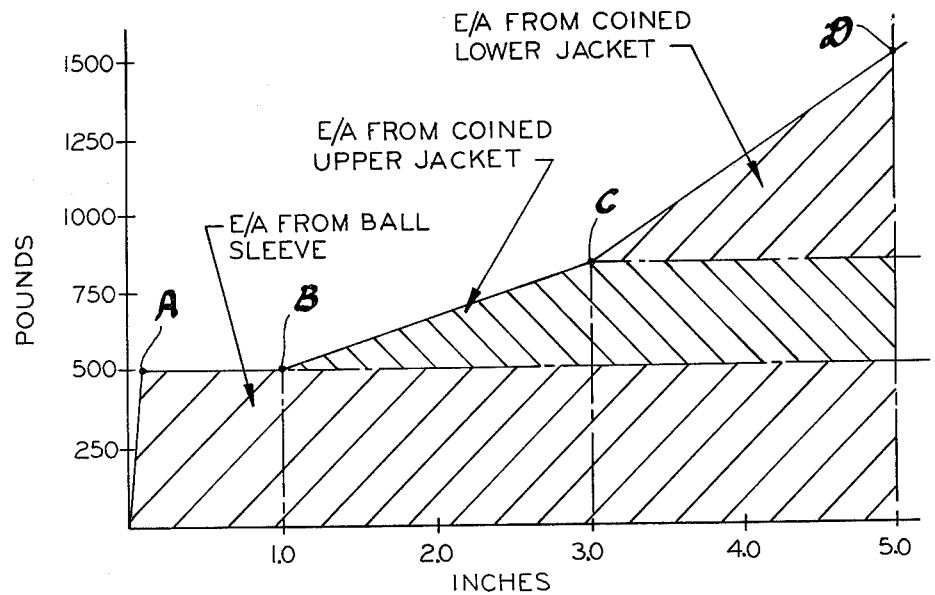
FIG. 4 is a graph illustrating operation of the steering column of FIGS. 1-3 when stroked on application of a predetermined load directed thereto.

On application of a load to the steering wheel exceeding a predetermined load, the capsules release the column which begins to telescope together. As this initial telescopic movement occurs, the upper and lower ball sets cold roll and work the metal of the upper and lower jackets to form linear grooves or tracks therein to dissipate energy. This action is illustrated by stage 1, segment A-B of the absorption curve of FIG. 4. A constant 500 pound load occurs during the first one inch of travel as shown in the chart. During this one inch travel the ball sleeve travels approximately one-half inch. At one inch travel as shown, the column load increases from 500 pounds, as the upper ball ramps 46 are encountered by the upper ball sets and further telescopic collapse of the steering column assembly occurs. Energy absorption (E/A) is progressively increased as the upper ball set cold rolls the ball tracks into the ramps 46 as illustrated by segment B-C or stage 2 of the energy absorbing curve. If additional E/A is required at three inches, then the lower jacket ball ramps 48 are encountered by the lower ball sets. When this occurs, the lower ball sets cold work the material of the lower jacket ramps 48 and form tracks therein as the absorption of the column is progressively increased as shown by segment C-D or stage 3 of the FIG. 4 curve as the column collapses to its full five inch stroke.

From the above, it will be appreciated that both the upper and lower ball sets cooperate with the associated ramps to provide for progressively increasing energy absorbing capability so that this steering column assembly provides tailored energy absorption for a wide range of loads from light loads through heavy loads.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. An energy absorbing steering column assembly for a vehicle having steerable road wheels comprising a pair of telescopically related mast jacket tubes having a plurality of balls adapted to roll between the walls of the tube during telescopic movement thereof and to plastically deform and form grooves in such walls in a first stage of energy absorption, the improvement comprising first ramp means operatively engaged by a predetermined complement of said balls after predetermined telescopic travel of said column to increase the energy absorbing capacity of said column in a second stage of energy absorption and second ramp means in another of said tubes subsequently operatively engaged by a second complement of said balls to further progressively increase the rate of energy absorption as said tubes relatively move toward the maximum telescoped position in a third stage of energy absorption.

2. Energy absorbing steering column assembly for a vehicle having steerable road wheels comprising a pair of telescopically related tubes having a deforming ball unit operatively mounted therebetween, the ball unit comprising a sleeve of plastic material having first and second complements of balls therein disposed in annular arrangements adjacent the ends of said sleeve which roll predetermined paths in said tubes in a first stage of energy absorption upon the application of a predetermined load to telescopically collapse said tubes, the improvement comprising first ramp means and one of said tubes operatively engaged by a predetermined complement of said balls after a given telescopic travel of said column which progressively increases the energy absorbing capacity of said column in a second stage of energy absorption and second ramp means in another of said tubes subsequently operatively engaged by a second complement of said balls to further progressively increase the rate of energy absorption as said tubes relatively move toward the maximum telescoped position in a third stage of energy absorption.

3. Energy absorbing steering column assembly for a vehicle having steerable road wheels comprising a pair of telescopically related metallic tubes having a deforming ball unit operatively mounted therebetween, the ball unit comprising a cylindrical sleeve of plastic material having first and second complements of balls therein disposed in annular arrangements adjacent opposite ends of said sleeve which roll predetermined paths in the walls said tubes in a first stage of energy absorption upon the application of a predetermined load telescopically collapsing said tubes, the improvement comprising a first series of ramp means internally of one of said tubes operatively engaged by a predetermined complement of said balls after a given telescopic travel of said tubes which progressively increases the energy absorbing capacity of said column in a second stage of energy absorption and second ramp means in another of said tubes subsequently operatively engaged by a second complement of said balls to further progressively increase the rate of energy absorption as said tubes relatively move toward the maximum telescoped position in a third stage of energy absorption.

* * * * *